US009250933B2

(12) United States Patent
Inada

(10) Patent No.: US 9,250,933 B2
(45) Date of Patent: Feb. 2, 2016

(54) INFORMATION PROCESSOR WITH CONFIGURATION MODIFICATION FUNCTION

(75) Inventor: Hajime Inada, Chiryu (JP)

(73) Assignee: Brother Kogyo Kabushiki Kaisha, Nagoya-shi, Aichi-Ken (JP)

( * ) Notice: Subject to any disclaimer, the term of this patent is extended or adjusted under 35 U.S.C. 154(b) by 1361 days.

(21) Appl. No.: 11/733,765

(22) Filed: Apr. 11, 2007

(65) Prior Publication Data
US 2007/0240148 A1 Oct. 11, 2007

(30) Foreign Application Priority Data

Apr. 11, 2006 (JP) ................................. 2006-108795

(51) Int. Cl.
G06F 9/44 (2006.01)
G06F 9/445 (2006.01)
(52) U.S. Cl.
CPC ................................. G06F 9/44536 (2013.01)
(58) Field of Classification Search
None
See application file for complete search history.

(56) References Cited

U.S. PATENT DOCUMENTS

| 5,555,418 A * | 9/1996 | Nilsson et al. ................ 717/153 |
| 5,740,359 A * | 4/1998 | Hasegawa et al. ........... 714/47.3 |
| 7,472,122 B2 * | 12/2008 | Ishida et al. |
| 2004/0010786 A1 * | 1/2004 | Cool et al. ..................... 717/170 |

FOREIGN PATENT DOCUMENTS

| JP | H03-164934 A | 7/1991 |
| JP | H07-295796 A | 11/1995 |
| JP | H09-222998 A | 8/1997 |
| JP | 2000-207178 A | 7/2000 |

OTHER PUBLICATIONS

Japan Patent Office, Office Action for Japanese Patent Application No. 2006-108795 (counterpart to above-captioned patent application), mailed Nov. 29, 2011.

* cited by examiner

Primary Examiner — Jason Mitchell
Assistant Examiner — Christine Dang
(74) Attorney, Agent, or Firm — Baker Botts L.L.P.

(57) ABSTRACT

An information processor has an older version program and a latest version program of the same application software installed thereon. The information processor includes: an older version detection unit that detects the older version program installed on the information processor; a path name modification unit that modifies a first path name of a file storing the older version program to a second path name if the older version detection unit detects the older version program; and a start program file generation unit that generates a start program file storing a start program. The start program file generation unit generates the start program file as a file having the first path name, after the path name modification unit executes the path name modification.

18 Claims, 10 Drawing Sheets

FIG.3A

| Apri | 2.0 | Common | Other Settings |
|---|---|---|---|
| | 3.0 | Common | Other Settings |
| | | Virsion | Major = 3<br>Minor = 0<br>C:¥Program Files¥Br¥Apri3.0¥Apri.exe |

FIG.3B

| Run | Apri2.0 | C:¥Program Files¥Br¥Apri2.0¥Apri.exe/StartParam |
|---|---|---|
| | Apri3.0 | C:¥Program Files¥Br¥Apri3.0¥Apri.exe/StartParam |

FIG.3C

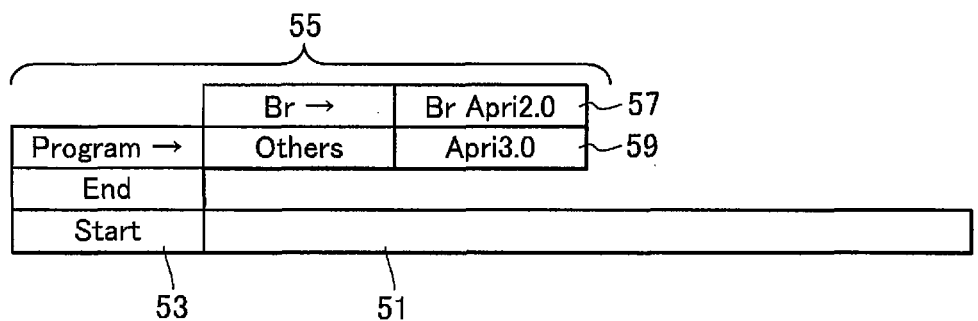

FIG.3D

| OldDevice | Events | Event1 | C:¥Program Files¥Br¥Apri2.0¥Apri.exe/Event1Param |
|---|---|---|---|
| | | Event2 | C:¥Program Files¥Br¥Apri2.0¥Apri.exe/Event2Param |
| NewDevice | Events | Event1 | C:¥Program Files¥Br¥Apri3.0¥Apri.exe/Event1Param |
| | | Event2 | C:¥Program Files¥Br¥Apri3.0¥Apri.exe/Event2Param |

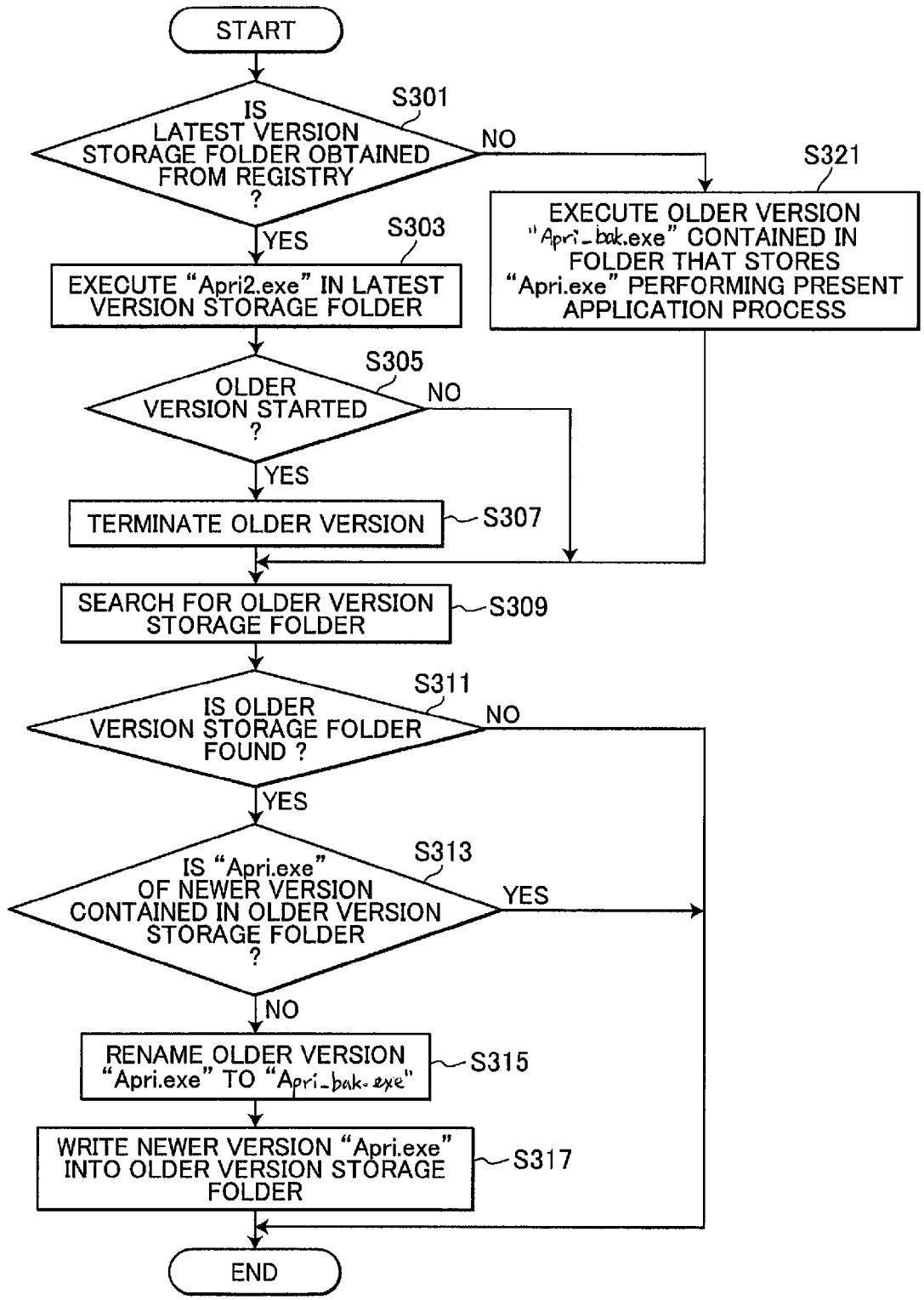

FIG.7A

| C:¥Program Files¥Br¥Apri2.0 ||
|---|---|
| Program Files<br>  Br<br>    [ Br Apri2.0 ] | Apri.exe |

FIG.7B

| C:¥Program Files¥Br¥Apri2.0 ||
|---|---|
| Program Files<br>  Br<br>    [ Br Apri2.0 ] | Apri_bak.exe |

FIG.7C

| C:¥Program Files¥Br¥Apri2.0 ||
|---|---|
| Program Files<br>  Br<br>    [ Br Apri2.0 ] | Apri_bak.exe<br>Apri.exe |

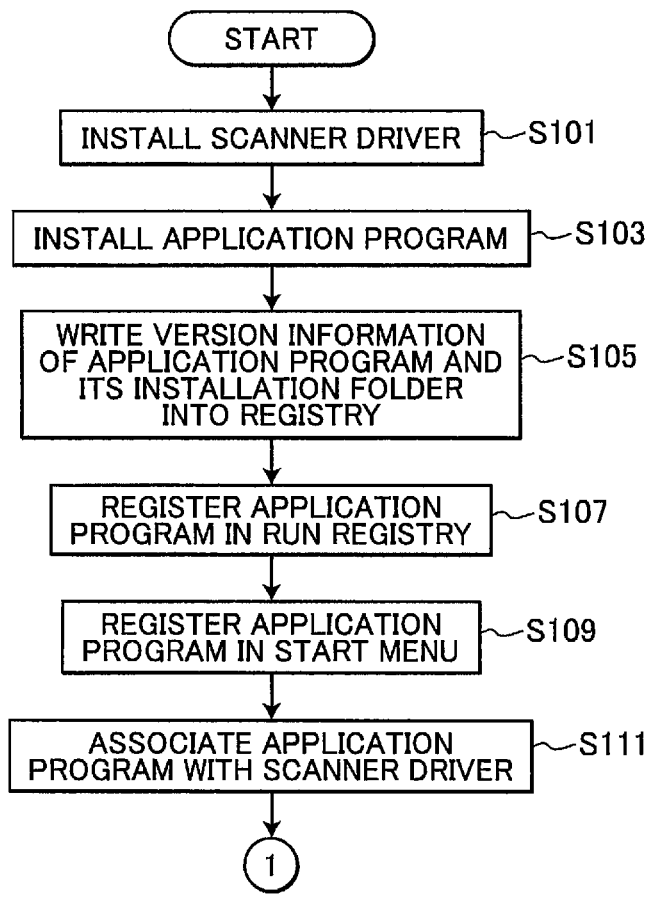

INFORMATION PROCESSOR WITH CONFIGURATION MODIFICATION FUNCTION

CROSS REFERENCE TO RELATED APPLICATIONS

This application claims priority from Japanese Patent Application No. 2006-108795 filed Apr. 11, 2006. The entire content of this priority application is incorporated herein by reference.

TECHNICAL FIELD

The present invention relates to an information processor which performs a process for modifying its configuration.

BACKGROUND

Japanese Unexamined Patent Application Publication No. Hei-7-295796 has proposed an information processor that stores a plurality of programs in different versions of the same application and that can start a selected one of the latest version program and the program one revision earlier than the latest one.

That is, the information processor starts the latest version program when a user presses a particular program start key that is assigned to the latest version program.

SUMMARY

In various information processors typified by a personal computer (hereinafter referred to as a "PC"), in addition to the program start key operation, programs are started by the occurrence of various events.

When an operating system (OS) is installed on an information processor, the start-up of the operating system may cause a predetermined program to start. When a user selects a predetermined program from a menu prepared for starting programs, the selection may cause the predetermined program to start. Furthermore, when a predetermined signal is transmitted from an external device capable of communicating with an information processor, the reception of the signal may cause a predetermined program to start. Which program is to be started when such various events occur, is typically determined for each event and registered in a storage area or the like managed by the operating system.

However, in order to change the program to be started by the occurrence of a given event from its older version to the newer version, if the older version program is associated with a plurality of events, all the information registered for each event has to be rewritten so as to support the newer version, thereby requiring tremendous labor.

Similarly, in order to return the newer version program to the older version after its upgrading, a tremendous labor is required.

It is an object of the present invention to provide an information processor which can easily change a program to be started by the occurrence of an event from its older version to its newer version, and which can easily return the program back from the newer version to the older version.

In order to attain the above and other objects, the invention provides an information processor having an older version program and a latest version program of the same application software installed thereon, and for making a modification from a configuration for starting the older version program if occurrence of a predetermined start event is detected, to a configuration for starting the latest version program when the occurrence of the predetermined start event is detected. The information processor includes: an older version detection unit; a path name modification unit; and a start program file generation unit. The older version detection unit detects the older version program installed on the information processor. The path name modification unit modifies a first path name of a file storing the older version program to a second path name if the older version detection unit detects the older version program. The start program file generation unit generates a start program file storing a start program. The start program starts the latest version program if the latest version program installed on the information processor is detected, and starts the older version program stored in a file having the second path name if the latest version program is not detected. The start program file generation unit generates the start program file as a file having the first path name, after the path name modification unit executes the path name modification.

According to another aspect, the invention provides a method of modifying a configuration of an information processor having an older version program and a latest version program of the same application software installed thereon, from a configuration for starting the older version program if occurrence of a predetermined start event is detected, to a configuration for starting the latest version program when the occurrence of the predetermined start event is detected, the method including: detecting the older version program installed on the information processor; modifying a first path name of a file storing the older version program to a second path name if the older version program is detected; and generating a start program file storing a start program, the start program starting the latest version program if the latest version program installed on the information processor is detected, and starting the older version program stored in a file having the second path name if the latest version program is not detected, the start program file being generated as a file having the first path name after the path name modification is executed.

According to another aspect, the invention provides a storage medium storing a set of program instructions executable on an image processor, the set of program instructions modifying a configuration of the information processor having an older version program and a latest version program of the same application software installed thereon, from a configuration for starting the older version program if occurrence of a predetermined start event is detected, to a configuration for starting the latest version program when the occurrence of the predetermined start event is detected, the instructions including: detecting the older version program installed on the information processor; modifying a first path name of a file storing the older version program to a second path name if the older version program is detected; and generating a start program file storing a start program, the start program starting the latest version program if the latest version program installed on the information processor is detected, and starting the older version program stored in a file having the second path name if the latest version program is not detected, the start program file being generated as a file having the first path name after the path name modification is executed.

BRIEF DESCRIPTION OF THE DRAWINGS

The particular features and advantages of the invention as well as other objects will become apparent from the following description taken in connection with the accompanying drawings, in which:

FIG. 3A illustrates an installation folder and version information of an application program;

FIG. 3B illustrates information on an application program to be started when an operating system starts;

FIG. 3C illustrates a shortcut to an application program registered in the Start Menu;

FIG. 3D illustrates information for associating a scanner driver with an application program;

FIG. 6 is a flow chart showing an application process according to the first embodiment;

FIGS. 7A through 7C illustrate how files stored in an older version storage folder are changed;

FIG. 8 is a flow chart showing a part of an installation process according to a second embodiment;

DETAILED DESCRIPTION

Figure 1:
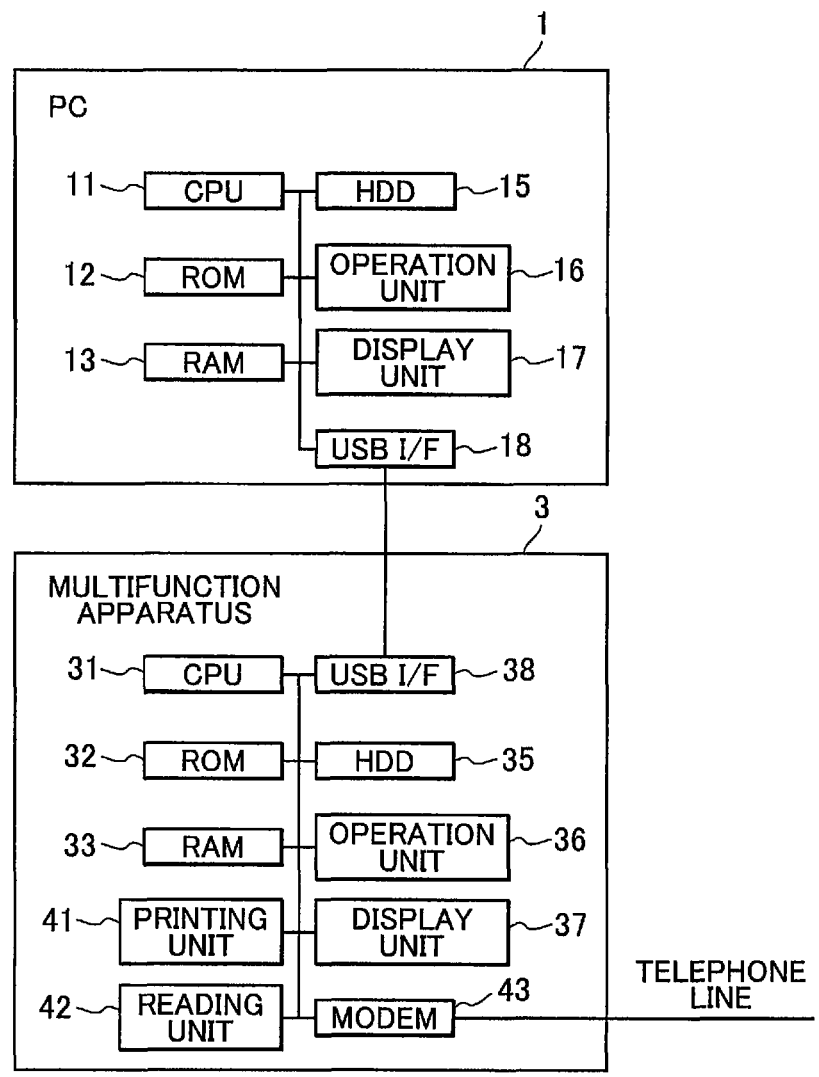
FIG. 1 is a block diagram showing an outline of a personal computer according to a first embodiment of the present invention and a multifunction apparatus connected to the personal computer.

An image processor according to embodiments of the invention will be described while referring to the accompanying drawings wherein like parts and components are designated by the same reference numerals to avoid duplicating description.

(1) First Embodiment

[Configuration of PC/Multifunction Apparatus]

FIG. 1 is a block diagram showing an outline of a personal computer 1 (hereinafter referred to as a "PC 1") according to a first embodiment of the present invention with a multifunction apparatus 3 connected to the PC 1.

Referring to FIG. 1, the PC 1 includes a CPU 11, a ROM 12, a RAM 13, a hard disk drive 15 (hereinafter referred to as a "HDD 15"), a operation unit 16, a display unit 17, and a USB interface 18 (hereinafter referred to as a "USB I/F 18").

The CPU 11 controls each unit of the PC 1 and performs various operations based on programs stored in the ROM 12 and the RAM 13. More specifically, the CPU 11 executes an operating system (OS); an installer; and an application (to be described later).

The ROM 12 is a storage device which stores data in a non-erasable form regardless of powering off the PC 1. The ROM 12 stores a BIOS (Basic Input/Output System) and data to be read, not to be updated in ordinary cases.

The RAM 13 is a storage device employed as main memory to be accessed directly by the CPU 11. In the RAM 13, the operating system and various software applications are loaded from the HDD 15. The various calculation results obtained by the CPU 11 and the data read from the HDD 15 are also stored in the RAM 13. When the CPU 11 executes the operating system, the installer, or the application to be described later, the program for directing the CPU 11 to perform each process is loaded in the RAM 13 from the HDD 15. The CPU 11 then performs each process according to the program stored in the RAM 13.

The HDD 15 is a device which stores various programs and various data files. The programs for executing the operating system, the installer, and the application are also stored in the HDD 15.

The operation unit 16 is an input device for entering various directions from a user. The operation unit 16 includes a keyboard and various pointing devices (for example, a mouse). The display unit 17 is an output device for presenting various types of information to a user. The display unit 17 includes a liquid crystal display capable of displaying a color image.

The USB I/F 18 is a USB (Universal Serial Bus)—compliant serial interface. To the USB I/F 18, various devices such as a printer, a keyboard, a mouse, a scanner, a speaker, and various storage devices are connectable. In this embodiment, the multifunction apparatus 3 is connected thereto.

In order to control the above hardware group, the PC 1 includes an operating system having the multitasking function. The multitasking function of the operating system allows the PC 1 to perform processes concurrently based on a plurality of software programs on a time-shared basis so that the installer and the application to be described later are operable on the PC 1. Examples of the operating system having the multitasking function include Mac OS (registered trademark), Windows (registered trademark), and Linux (registered trademark). Various functions provided by the operating system, including the multitasking function, are known, so detailed description thereof is omitted here. Hereinafter, a description is given based on the assumption that the PC 1 has various functions provided by Windows (registered trademark).

Although used as a scanner, as will be described later in this embodiment, the multifunction apparatus 3 also operates as a printer, a copier, a facsimile machine, and a telephone set.

The multifunction apparatus 3 includes a CPU 31, a ROM 32, a RAM 33, a hard disk drive 35 (hereinafter referred to as a "HDD 35"), a operation unit 36, a display unit 37, a USB I/F 38, a printing unit 41, a reading unit 42, and a modem 43.

The CPU 31 controls each unit of the multifunction apparatus 3 and performs various operations based on a control program stored in the ROM 32.

The ROM 32 is a storage device which stores data in a non-erasable form regardless of powering off the multifunction apparatus 3. In addition to the control program, the ROM 32 stores various types of data to be read, not to be updated in ordinary cases.

The RAM 33 is a storage device employed as main memory to be accessed directly by the CPU 31. The various types of data calculated by the CPU 31 during processing are stored temporarily in the RAM 33.

The HDD 35 stores image data of a relatively large size for an image to be transmitted or received by the facsimile function of the multifunction apparatus 3; an image obtained by the image scanner function; and an image to be printed by its printer function.

The operation unit 36 is an input device used when a user manually gives an instruction to the multifunction apparatus 3.

The display unit 37 includes a relatively small liquid crystal display so as to present the setting of the multifunction apparatus 3 and its status.

The USB I/F 38 is a USB (Universal Serial Bus)—compliant serial interface. The USB I/F 38 allows data to be transmitted/received between the multifunction apparatus 3 and the PC 1.

The printing unit 41 makes prints on a sheet-like medium (for example, a record sheet). The printing unit 41 operates for printing print data by the printer function, for printing a received image by the facsimile function, and printing an image to be copied by the copier function.

The reading unit 42 obtains an image from the document set on an automatic document feeder (not shown) or the document placed on the glass surface of a flat bed. The reading unit 42 operates for obtaining image data by the image scanner function, and for obtaining image data to be transmitted by the facsimile machine function.

The modem 43 converts digital data generated on the side of the multifunction apparatus 3 to audio signals for transmission over a telephone line, and converts the audio signals received over the telephone line to digital data for processing on the side of the multifunction apparatus 3. The modem 43 operates for transmitting/receiving an image by the facsimile function, and for making a call by the telephone function.

[Outline of Installer and Application]

Next, a description is given for an installer which runs on the PC 1, and application software which is installed by the installer.

An installer is a software program which installs, on the PC 1, a software program which is required when the scanner system of the multifunction apparatus 3 is controlled from the PC 1. In order to use the scanner system of the multifunction apparatus 3 for the first time with the PC 1, at least one process has to be performed by the installer (hereinafter referred to as an "installation process") before using the scanner system of the multifunction apparatus 3. In this process, the setup required for using the scanner system of the multifunction apparatus 3 with the PC 1 is completed. A detailed description will be given for the installation process.

An installer program is provided by being stored, for example, in a removable media device (CD-ROM or the like) as an accessory attached to the multifunction apparatus 3. In this case, the program is loaded into the RAM 13 in the PC 1 from the removable media device so as to execute the installer. It is also possible to load the program into the RAM 13 automatically simply by putting the removable media device in a drive of the PC 1 depending on the settings on the sides of the PC 1 and the removable media device. The installer program may be provided from a server through a network such as the Internet. In this case, the installer program downloaded through the network is stored temporarily in the HDD 15 or the like in the PC 1, and then loaded from the HDD 15 or the like into the RAM 13, so as to execute the installer program.

The installer installs software programs such as a scanner driver and applications onto the PC 1.

The application software to be installed by the installer has different versions, among which the installer installs the latest version program of the application on the PC 1. The older version program of the application has already been installed on the PC 1.

It is noted that the application program of the latest version is divided into: a main program for controlling various functions of the multifunction apparatus 3; and a start program that is started by the operating system when the operating system detects that a predetermined operation is performed on the side of the multifunction apparatus 3 and that starts the main program. Contrarily, the application program of the older version includes a corresponding main program only.

The older version program of the application, similarly to its newer version program, controls various functions of the multifunction apparatus 3. The PC 1 having only the older version program installed thereon starts the older version program when the predetermined operation is performed on the side of the multifunction apparatus 3. If the latest version program of the application is installed by the installer, the configuration of the PC 1 is subsequently modified such that the latest version program starts when the predetermined operation is performed on the side of the multifunction apparatus 3.

The "older version program" may be one revision that was issued earlier than the latest version program, or another revision that had been issued further earlier than the earlier version program. There may be two or more programs of different versions issued earlier than the latest version program. In this embodiment, any version of a software program except its latest version will be referred to as the older version program hereinafter. Among these two or more older programs of different versions, only one may have been installed on the PC 1, or two or more of them may have been installed on the PC 1. In the latter case, all of the two or more coexisting programs can be referred to as the older version programs.

[Installation Process]

Figure 2:
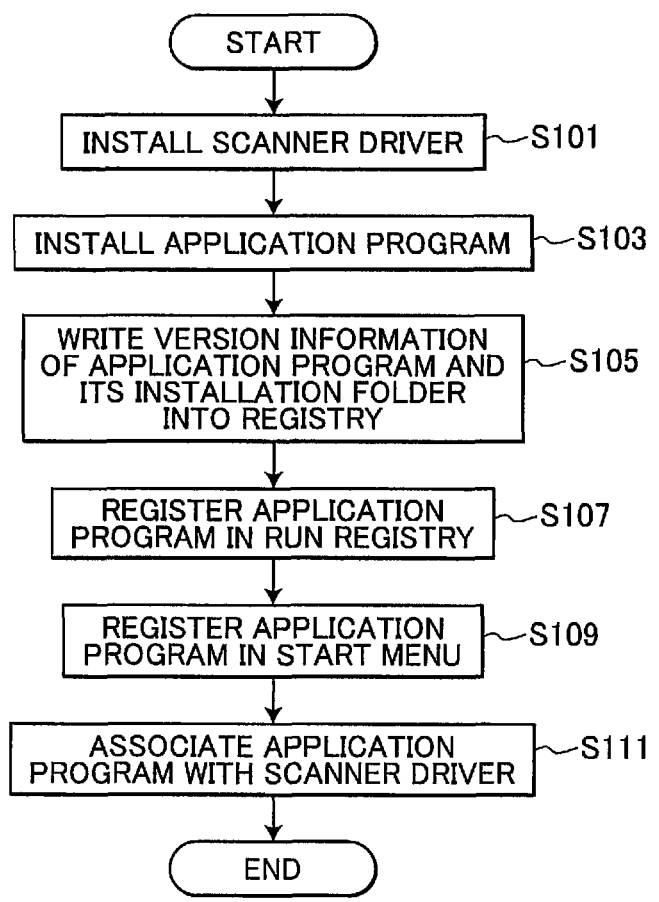
FIG. 2 is a flow chart showing an installation process according to the first embodiment.

Referring now to FIG. 2, a description is given for an installation process which is performed by the installer running on the PC 1.

When an installation process is started on the PC 1, the PC 1 installs a scanner driver thereon (S101). In step S101, files including a program file of the scanner driver and a configuration file to be used by the scanner driver are generated in a predetermined folder (for example, a system folder of the operating system). More specifically, for example, when installation is performed from a removable media device such as a CD-ROM, the program file and the configuration file stored in the removable media device in a compressed format are decompressed and developed on the RAM 13. The decompressed contents are written in files in the predetermined folder so that the expected files are generated. Whether or not the compressed files are used is arbitrary. The expected files may also be generated by simply copying the files in a non-compressed format to the predetermined folder.

When the installation of the scanner driver is completed, the PC 1 then installs an application program thereon (S103). In step S103, program files of the application program and various configuration files are generated in a predetermined folder in the same way as in step S101. More specifically, in this embodiment, in step S103, program files of the application program and various configuration files are generated in a folder "C:¥Program Files¥Br¥Apri3.0" for storing the latest version application. In this case, program files "Apri.exe" and "Apri2.exe" are generated. The program file "Apri.exe" stores the start program for the latest version application, and the program file "Apri2.exe" stores the main program for the latest version application.

When the installation of these files is completed, the PC 1 writes the version information of the application and its installation folder into a registry (S105). The registry is a storage area for storing information that is required when the operating system manages various programs. In step S105, the information shown in FIG. 3A is registered in the registry. In this embodiment, the older version program of the application has been installed on the PC 1. In the registry shown in FIG. 3A, therefore, the information on the older version program (the information to which the information "2.0" is attached in FIG. 3A) has been registered. If step S105 is completed, the older version program information in the registry is left unchanged, and the information on the latest version program (the information to which the information "3.0" is attached in FIG. 3A) is added in the registry.

Next, the PC 1 registers the application program into a RUN registry (S107). The RUN registry is a storage area for storing the information on the application to be started when the operating system starts. In step S107, the information shown in FIG. 3B is registered in the RUN registry. In this embodiment, the older version program of the application has been installed on the PC 1. In the RUN registry shown in FIG. 3B, therefore, the information on the older version program (the information to which the information "Apri2.0" is attached in FIG. 3B) has been registered. When step S107 is completed, the older version program information in the RUN registry is left unchanged, and the information on the latest version program (the information to which the information "Apri3.0" is attached in FIG. 3B) is added therein.

Next, the PC 1 registers the application program in the Start Menu (S109). The Start Menu is provided as Windows' (registered trademark) standard user interface so as to allow a user to start an application program. In step S109, the application program is registered in the Start Menu. So, a user can start the application by using the Start Menu thereafter. Specifically, for example, as a user clicks a start button 53 provided at the end of a task bar 51 (see FIG. 3C) displayed on the display unit 17, using a pointing device such as a mouse, a menu 55 having a hierarchical structure is displayed. There are displayed shortcuts 57 and 59 to the application program in the menu 55. If the user selects either of the shortcuts 57 and 59, the application is started. The shortcut 57 is created when the older version program is installed. The shortcut 59 is created in step S109. In this embodiment, the configuration of the PC 1 is modified such that the latest version program is started by the process to be described later, regardless of whether either of the shortcuts 57 and 59 is selected. A description will be given for this respect later in detail.

When step S109 is completed, the PC 1 associates the application program with the scanner driver (S111). Specifically, the information shown in FIG. 3D is registered in the storage area for the scanner driver, located in the registry. In this embodiment, the older version program of the application has been installed on the PC 1. In the registry shown in FIG. 3D, therefore, the information on the older version program (the information to which the information "OldDevice" is attached in FIG. 3D) has been registered therein. When step S111 is completed, the older version program information in the registry is left unchanged, and the information on the latest version program (the information to which the information "NewDevice" is attached in FIG. 3A) is added in the registry.

Figure 4A:
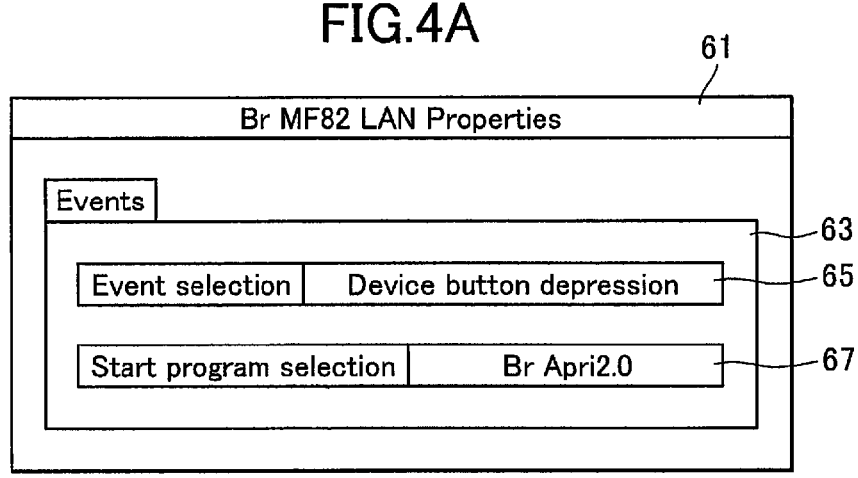
FIG. 4A illustrates a dialog box displaying the property of a scanner associated with an older version program.
Figure 4B:
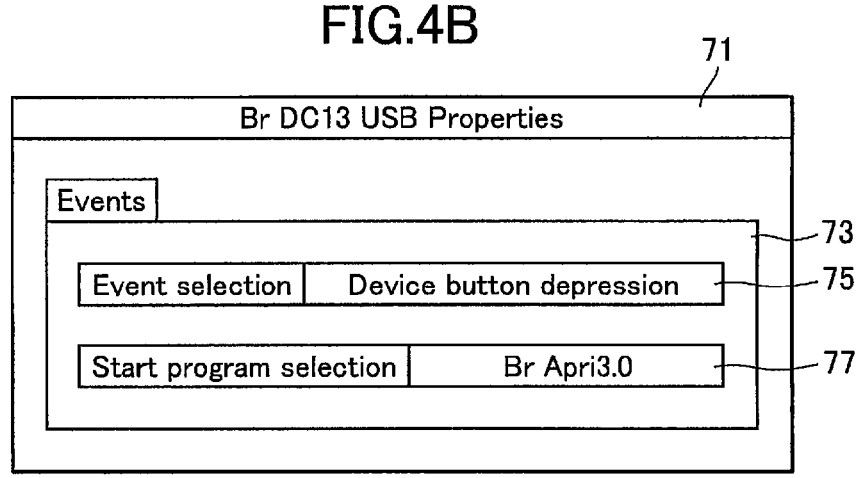
FIG. 4B illustrates a dialog box displaying the property of a scanner associated with the latest version program.

The information shown in FIG. 3D can be confirmed in the property page for the associated scanner. For example, as shown in FIG. 4A, as the property page for the scanner associated with the older version program is opened, a subpage 63 having an event tab is displayed in a dialog box 61, thereby displaying an event selection field 65 and a program selection field 67 provided in the subpage 63. The contents displayed in the event selection field 65 and the program selection filed 67, correspond to the information "OldDevice" contained in the information shown in FIG. 3D. As shown in FIG. 4B, as the properties of the scanner (the multifunction apparatus 3 in this embodiment) associated with the latest version program are displayed, a subpage 73 having an event tab is displayed in a dialog box 71, thereby displaying an event selection field 75 and a program selection field 77 provided in the subpage 73. The contents displayed in the event selection filed 75 and the program selection field 77, correspond to the information "NewDevice" contained in the information shown in FIG. 3D.

When the process of step S111 is completed, the PC 1 finishes the installation process. In this embodiment, whenever the installation process is finished, the operating system needs restarting. As the operating system is restarted, the application is started based on the information registered in the RUN registry in step S107.

[Request Monitoring Process]

Figure 5:
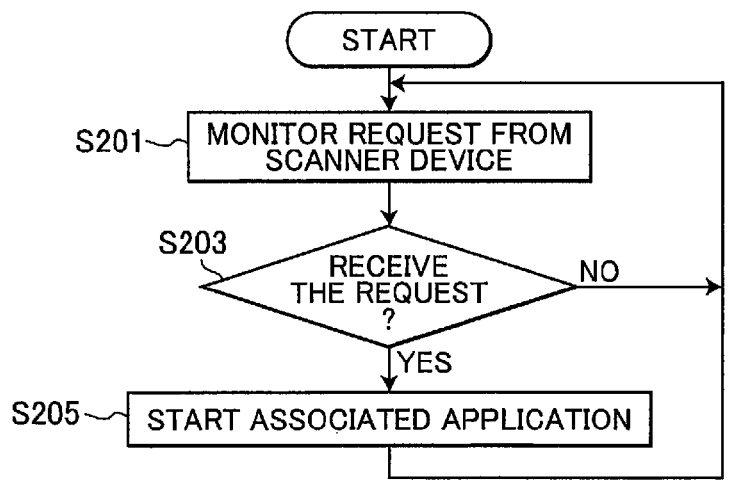
FIG. 5 is a flow chart showing a request monitoring process.

Referring now to FIG. 5, a description is given for a request monitoring process which is performed by the operating system and the scanner driver in cooperation. The request monitoring process is for starting the application when the PC 1 detects a signal that is sent from the multifunction apparatus 3 when the user performs a predetermined operation on the multifunction apparatus 3.

When the request monitoring process is started, the PC 1 monitors a request from the scanner device (the multifunction apparatus 3 in this embodiment) (S201), and determines whether or not the request has been received (S203). If the request has not been received (S203: NO), which means that the predetermined operation has not been performed in the multifunction apparatus 3, the process returns to step S201 so as to continue the request monitoring.

In contrast, if a determination is made that the request has been received in step S203 (S203: YES), an application associated with the scanner driver is started (S205). In step S205, the information that has been registered in the registry in step S111 is referred to so that the application is started. After step S205, the process returns to step S201 so as to restart the request monitoring.

[Application Process]

Referring next to FIG. 6, a description is given for an application process which is performed by the application. In this embodiment, as has been described above, the application of the latest version includes a main program and a start program, while the application of the older version includes a main program only. Note that the configuration modification process according to this embodiment is included in the start program. FIG. 6 shows a flow chart of the start program. Description of the flow chart of the main program which is started during a process executed based on the start program will be omitted here.

When the application process is started, the PC 1 determines whether or not the PC 1 has fetched or obtained the latest version storage folder from the registry (S301). It is noted that in step S301, the latest version information can be obtained from the version information stored in the registry in the following cases: the case in which only the program of Ver. 3.0 or later has been installed; and the case in which both the program of Ver. 3.0 or later and the older version program of Ver. 2.0 or earlier have been installed. This is because when the program of Ver. 3.0 or later is installed, the version information of the program of Ver. 3.0 or later is stored in the registry as indicated by "Version" in FIG. 3A. Contrarily, when the program of Ver. 2.0 or earlier is installed, the version information of the program of Ver. 2.0 or earlier is not stored in the registry as shown in FIG. 3A. In either case, the PC 1 makes an affirmative determination that the latest version storage folder has been obtained. In contrast, when only the older version program (the program of Ver. 2.0 or earlier) has been installed, the PC1 makes a negative determination that the latest version storage folder cannot be obtained.

If an affirmative determination is made in step S301 (S301: YES), the PC 1 executes the file "Apri2.exe" contained in the latest version storage folder (S303). The file "Apri2.exe" stores the main program of the latest version of the application. In this embodiment, since "Apri2.exe" is stored in the latest version storage folder "C:¥Program Files¥Br¥Apri3.0", the file "C:¥Program Files¥Br¥Apri3.0¥Apri2.exe" is started in step S303.

Next, the PC 1 determines whether or not the main program of the older version older than the latest version, has been started (S305). If the older version main program has been started (S305: YES), the PC 1 terminates the older version main program (S307). In contrast, if the older version main program is not started (S305: NO), the process skips step S307.

Next, the PC 1 searches the registry for the older version storage folder which stores the older version main program (S309). If both the latest version and older version programs have been installed, or if only the older version program has been installed, the older version storage folder is detected in step S309. In contrast, if only the latest version program has been installed, no older version storage folder is detected.

The PC 1 then determines whether or not the older version storage folder has been found (S311). If the older version storage folder has been found (S311: YES), the PC 1 makes a determination in S313 whether or not the start program "Apri.exe" of the newer version is contained in the older version storage folder. It is noted that the start program "Apri.exe" of the newer version is designed to start the main program of the latest version that is determined to be of the latest version based on the version information "Version" stored in the registry as shown in FIG. 3A. The determination of S313 is equivalent to a determination whether the "Apri.exe" contained in the older version storage folder is different from the older version main program.

If a determination is made that the "Apri.exe" of the newer version start program is not contained but the "Apri.exe" of the older version main program is contained in the older version storage folder in step S313 (S313: NO), the PC 1 renames the older version main program file "Apri.exe" to "Apri_bak.exe" (S315), and writes the newer version start program file "Apri.exe" into the older version storage folder (S317). That is, the PCI copies the newer version start program file "Apri.exe" stored in the latest version storage folder into the older version storage folder. In this way, through steps S315 and S317, the newer version start program file "Apri.exe" becomes contained in the older version storage folder.

It is noted that when the contents of the older version storage folder "C:¥Program Files¥Br¥Apri2.0" are displayed before step S315 is performed, the older version main program file "Apri.exe" is found as shown FIG. 7A. Immediately after step S315 is performed, the older version main program file "Apri.exe" is renamed to "Apri_bak.exe" as shown in FIG. 7B. Furthermore, after step S317 is performed, the newer version main program file "Apri.exe" is written into the older version storage folder as shown in FIG. 7C. As a result, the older version storage folder contains both the newer version start program file "Apri.exe" and the older version main program file "Apri_bak.exe" which corresponds to the main program file "Apri.exe" for the older version.

On the other hand, if steps S315 and S317 (or processes equivalent thereto) have already been performed, the newer version start program file "Apri.exe" has already been installed in the older version storage folder. In step S313, therefore, a determination is made that the newer version "Apri.exe" has been installed in the older version storage folder (S313: YES), and the process skips step S316 and step S317.

If a determination is made that the older version storage folder has not been found in step S311 (S311: NO), the process skips step S315 and step S317. After steps S316 and S317 are performed or skipped, the PC 1 terminates this process of the start program. Subsequently, the process of the main program started in step S303 operates as the application.

The foregoing description has been given for the case in which an affirmative determination is made in step S301. However, a negative determination may be made in step S301. Such a negative determination is made, for example, in the following situation: The latest version application has been executed, and consequently, the newer version start program file "Apri.exe" is written in the older version storage folder in step S317. After that, the latest version application has been uninstalled. That is, the latest version information has been deleted from the registry due to uninstallation. In this situation, the newer version start program "Apri.exe" written in the older version storage folder is executed to perform the application process of FIG. 6. Although the "Apri.exe" written in the older version storage folder is executed, a negative determination is made in step S301 since the latest version information has been deleted from the registry due to uninstallation.

If a negative determination is made in step S301 (S301: NO), the PC 1 executes the older version main program "Apri_bak.exe" contained in the folder that stores the new version start program "Apri.exe" performing this application process of FIG. 6 (S321). It is noted that the older version main program "Apri_bak.exe" started in step S321 is different from the latest version main program "Apri2.exe" started in step S303, but is the one that has been renamed in step S315 from "Apri.exe". Since the renamed file "Apri_bak.exe" is stored in the older version storage folder "C:¥Program Files¥Br¥Apri2.0" in this embodiment, the file "C:¥Program Files¥Br¥Apri2.0¥Apri_bak.exe" is started in step S321.

After completing step S321, the process proceeds to step S309. The foregoing description has been given for step S309 and its subsequent steps, so their description is omitted here.

To summarize, the application process flows as described below:

<1> When the latest version application is first activated, the latest version start program "Apri.exe" contained in the latest version storage folder is executed. Accordingly, the application process of FIG. 6 is executed. In this case, the process generally flows from S301, through S303, S305, S309, S311, S313, S315, and S317, and ends.

<2> When the latest version application is activated after the first activation of the latest version <1>, the latest version start program "Apri.exe" contained in the latest version storage folder is executed. Accordingly, the application process of FIG. 6 is executed. In this case, the process generally flows from S301, through S303, S305, S309, S311, and S313, and ends.

<3> Assume that after the first activation of the latest version <1>, the older version application is activated. In such a case, the latest version start program "Apri.exe" contained in the older version storage folder is executed. Accordingly, the application process of FIG. 6 is executed. In this case, the process generally flows from S301, through S303, S305, S309, S311, and S313, and ends. Thus, although the older version application is activated, the latest version application is executed by executing the latest version main program file "Apri2.exe" contained in the latest version storage folder.

<4> Assume that the latest version is uninstalled after the first activation of the latest version <1>. In such a case, when the older version application is activated, the latest version start program "Apri.exe" contained in the older version storage folder is executed. Accordingly, the application process of FIG. 6 is executed. In this case, the process generally flows from S301, through S321, S309, S311, and S313, and ends. Thus, the older version application is activated by executing the older version main program file "Apri_bak.exe".

Thus, according to the present embodiment, if the PC 1 can fetch the latest version storage folder from the registry (yes in S301), the program file "Apri2.exe" stored in the latest version storage folder is executed in S303. On the other hand, if the PC 1 cannot fetch the latest version storage folder (no in S301), the program file "Apri_bak.exe" contained in the older version storage folder which stores the file "Apri.exe" that the PC 1 is now executing to perform the application process of FIG. 6 is executed in S321. The "Apri2.exe" stored in the latest version storage folder is the main program file of the latest version. The "Apri_bak.exe" contained in the folder which stores the "Apri.exe" that the PC 1 is now executing to perform the process of FIG. 6 is the one that is obtained by renaming the older version main program file "Apri.exe". In this way, the process of FIG. 6 easily modifies the configuration of the PC 1 from the older configuration that executes the application program of the older version upon detecting the occurrence of a predetermined application start event to the latest configuration that executes the application of the latest version upon detecting the occurrence of the same event, and easily returns the modified configuration back to the original configuration.

As has been described above, in the PC 1, the older version main program "Apri.exe" contained in the older version storage folder "C:¥Program Files¥Br¥Apri2.0" is replaced with the latest version start program "Apri.exe" for starting the latest version application. Therefore, the PC 1 is modified from the configuration for starting the older version main program "Apri.exe", to the configuration for starting the latest version start program "Apri.exe" to start the latest version application and for starting the latest version program in step S303, while leaving unchanged the mechanism for starting a file "Apri.exe" stored in the older version storage folder when the PC 1 detects the occurrence of the application start event.

In addition, in order to return to the configuration for starting the older version program from the modified configuration for starting the latest version program, it is only necessary to make the latest version program undetectable, by deleting its information in the registry, or by deleting the file storing the latest version program, for example. A negative determination is made in step S301, and the older version program is started in step S321. It is unnecessary to return the path name "Apri_bak.exe" that has been renamed in step S315 back to the original path name "Apri.exe", and it is also unnecessary to delete the file "Apri.exe" written in S317. The PC 1 simply returns the configuration for starting the latest version program back to the configuration for starting the older version program, without tremendous labor.

In step S313, if the older version main program file "Apri.exe" stored in the older version storage folder has already been replaced with the latest version start program file "Apri.exe", steps S315 and S317 are skipped so as not to generate the latest version start program file "Apri.exe". This prevents the PC 1 from being overloaded.

In steps S305 to S307, even if the older version program has been started, it is possible to terminate the older version program. Therefore, the path name of the older version program can be appropriately modified in step S315.

In the first embodiment, the configuration modification process performed in steps S311 to S317 is incorporated in the start program of the application that starts in conjunction with the start of the operating system. When the operating system is started up, the configuration modification process in steps S311 to S317 is also performed. Assume that after the latest version application is installed, the older version application is reinstalled for any reason. If the latest version application is executed at least once due to the restart of the operating system or the like, the PC 1 simply returns from the configuration for starting the reinstalled older version application back to the configuration for starting the latest version application.

(2) Second Embodiment

Next, a second embodiment will be described. Note that the second embodiment is partially different from the first embodiment. A detailed description is given only for the parts different from the corresponding parts in the first embodiment. The description of the parts the same as in the first embodiment is omitted here.

Figure 9:
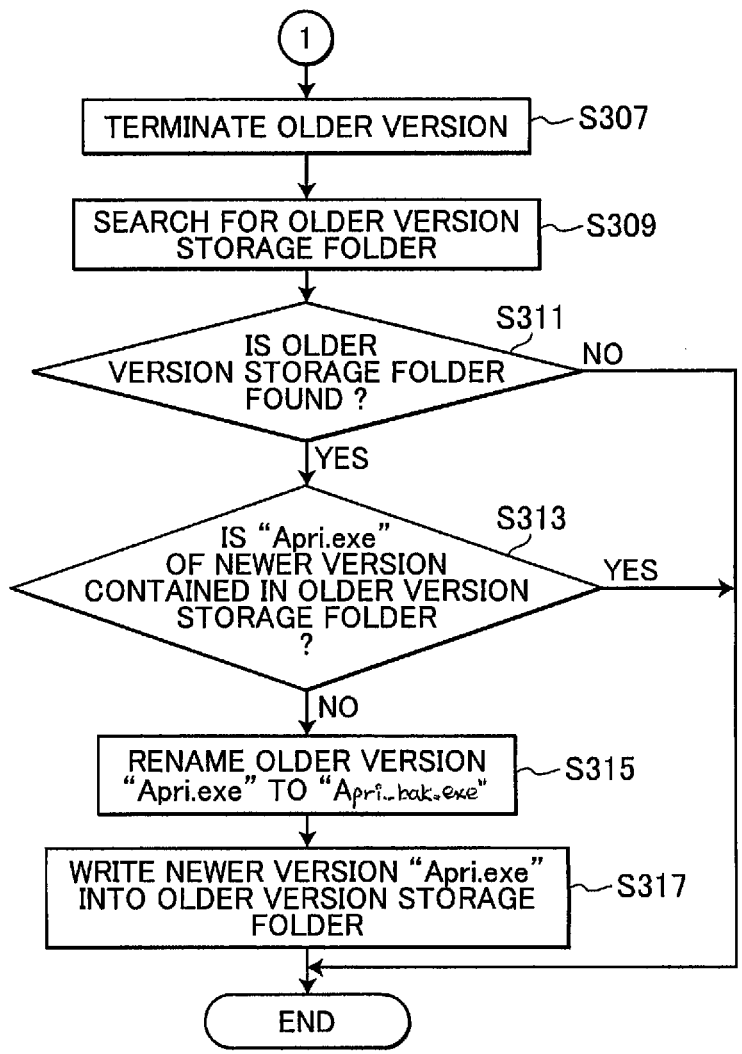
FIG. 9 is a flow chart showing another remaining part of the installation process according to the second embodiment.

The installation process performed by the installer according to the second embodiment is different from that of the first embodiment. Specifically, referring to FIG. 8 and FIG. 9, after steps S101 through S111 are performed, the installer successively performs steps S307 through S317.

In the first embodiment, Steps S101 through S111 are performed by the installer, but steps S307 through S317 are performed in the start program of the application. The processes performed in steps S101 through S111 and the processes performed in S307 through S317 are the same as those in the first embodiment, so description thereof is omitted here.

According to the installer thus configured, if the latest version program has been installed on the PC 1 by the installer, steps S311 through S317 are performed immediately. Therefore, without effecting any modification to the mechanism for starting the file "Apri.exe" stored in the older version storage folder, the PC 1 is modified from the configuration for starting the older version main program "Apri.exe", to the configuration for starting the latest version start program "Apri.exe" to start the latest version main program.

(3) Third Embodiment

According to the third embodiment, the functions of the start program and the main program according to the first embodiment are integrated together into a single set of program, and this single set of program is used as the latest version application. In other words, the third embodiment is different from the first embodiment in that the latest version application program is not divided into a start program and a main program.

According to the present embodiment, therefore, the application serves as the latest version application when the application executes the process contained therein. In this respect, it can be said that the application according to the third embodiment has a function equivalent to the main program of the first embodiment. In addition, the application according to the third embodiment has another function to start its older version application. In this respect, it can be said that the application according to the third embodiment has a function equivalent to the start program according to the first embodiment.

Figure 10:
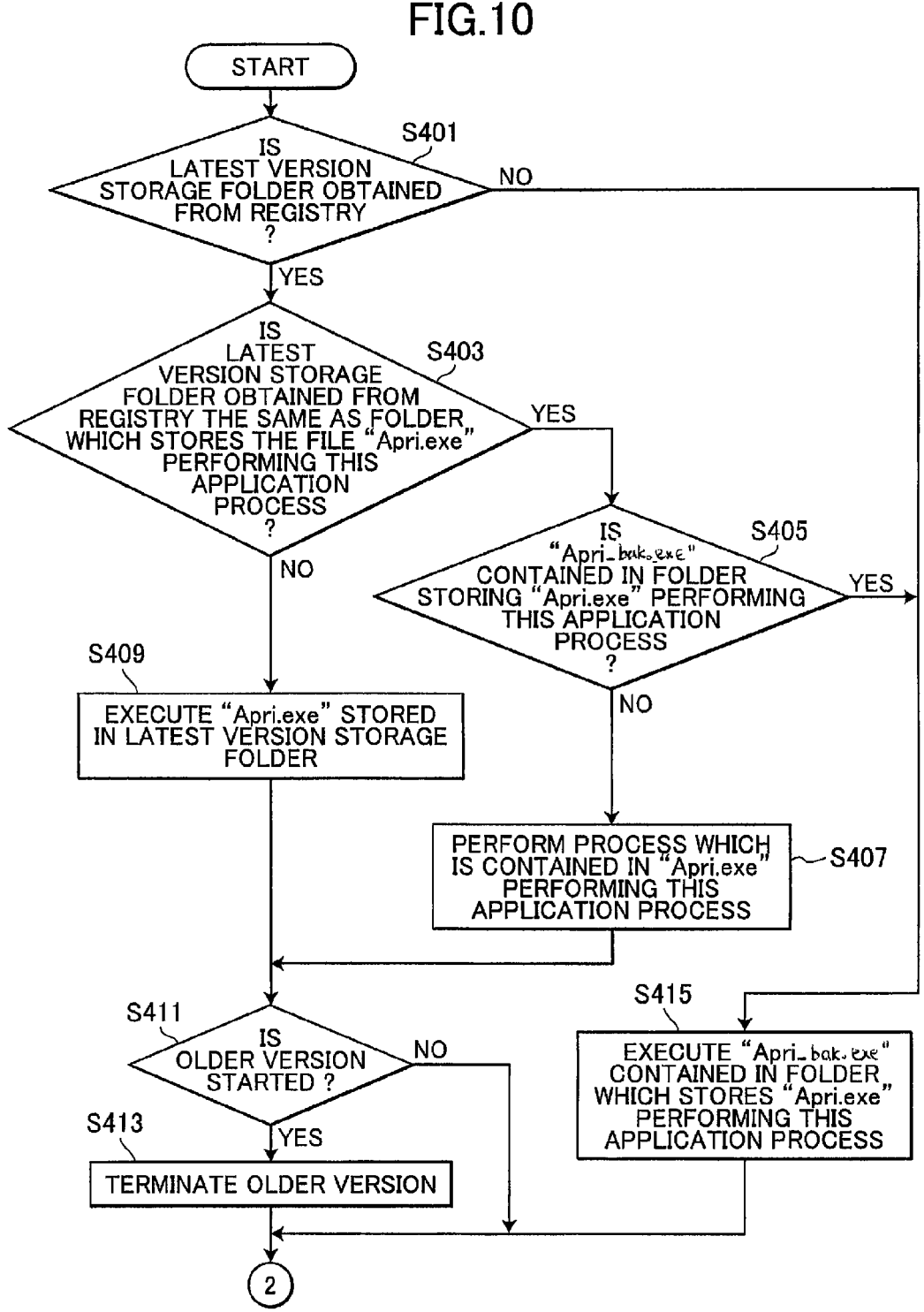
FIG. 10 is a flow chart showing a part of an application process according to a third embodiment.
Figure 11:
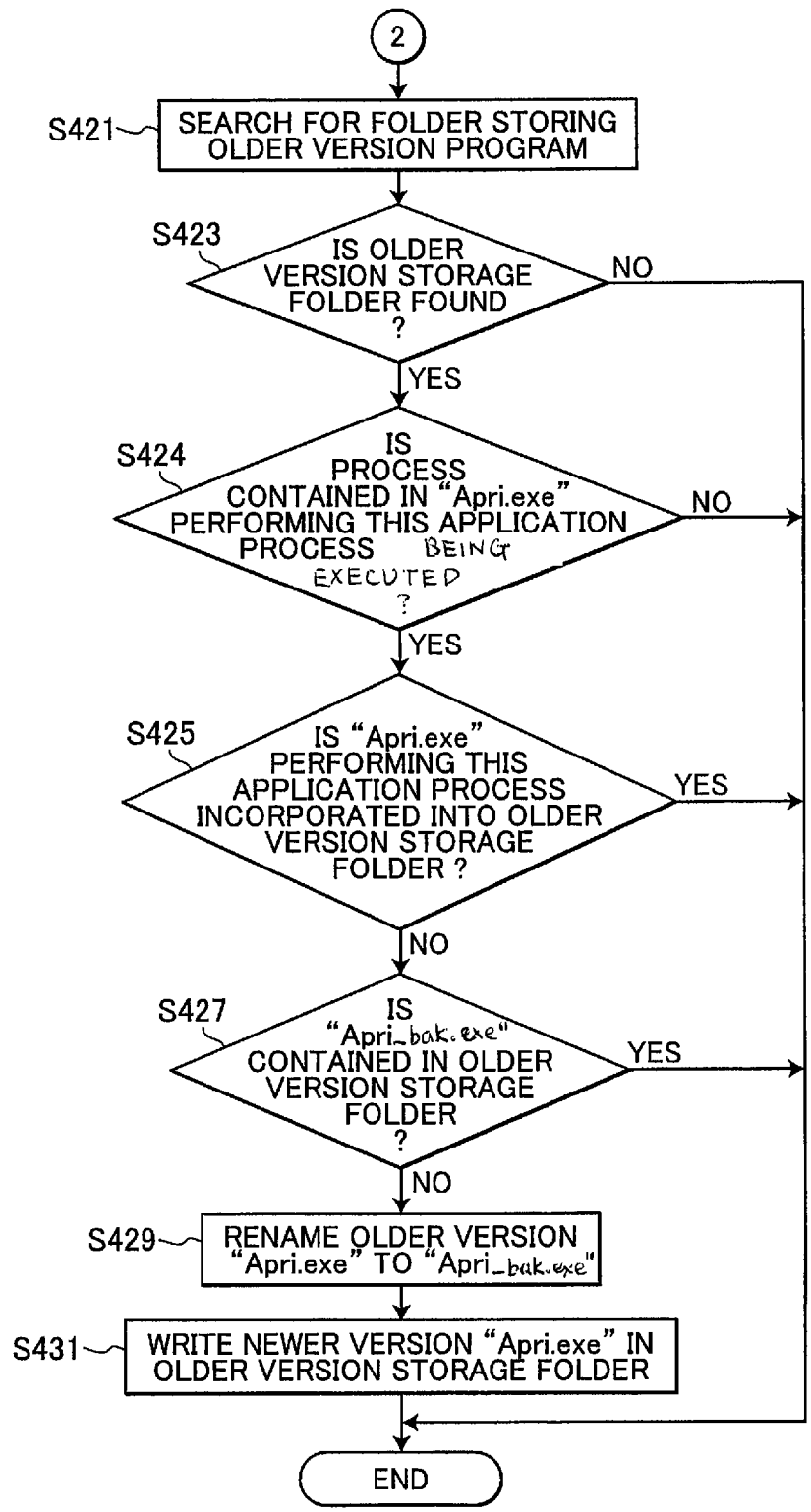
FIG. 11 is a flow chart showing another remaining part of the application process according to the third embodiment.

Referring to FIGS. 10 and 11, a description is given for an application process according to the third embodiment.

When an application process is started, the PC 1 determines whether or not the PC 1 has fetched or obtained the latest version storage folder from the registry (S401). In step S401, an affirmative determination is made that the latest version storage folder has been determined in the following cases: the case in which only the latest version program has been installed; and the case in which both the latest and older version programs have been installed. In contrast, if only the older version program has been installed, a negative determination is made that it is impossible to obtain the latest version storage folder.

If an affirmative determination is made in step S401 (S401: YES), the PC 1 determines in S403 whether or not the latest version storage folder obtained from the registry is the same as the folder that stores the file "Apri.exe" that is presently being executed to perform the present application process of FIG. 10. If the "Apri.exe" stored in the latest version storage folder has been started to presently execute the process of FIG. 10, an affirmative determination is made in step S403 that the latest version storage folder obtained from the registry is the same as the folder which stores the "Apri.exe" that is now performing the application process of FIG. 10. In contrast, if the "Apri.exe" stored in the older version storage folder has been started based on the process of step S431 (to be described later) to presently execute the process of FIG. 10, a negative determination is made in S403 that the latest version storage folder obtained from the registry is not the same as the folder that stores the "Apri.exe" that is now performing the application process of FIG. 10.

If an affirmative determination is made in S403 (S403: YES), the PC 1 determines whether or not the file "Apri_bak.exe" is contained in the folder storing the "Apri.exe" performing this application process (S405). If the "Apri_bak.exe" is not contained in the folder storing the "Apri.exe" performing this application process (S405: NO), this means that the "Apri.exe" performing this application process corresponds to the latest version program of the application. Accordingly, in S407, the PC 1 executes the process contained in the "Apri.exe" that is now performing this application process, to thereby allow the application to operate as in its latest version. Note that step S407 starts the operation as the latest version application in a separate thread. The specific process to be performed in the separate thread is not a substantial part of the present embodiment, so its description is omitted here.

On the other hand, if a negative determination is made in step S403 (S403: YES), the PC 1 executes the "Apri.exe" that is stored in the latest version storage folder (S409).

If either of steps S407 and S409 is performed, the latest version application stored in the latest version storage folder operates in both cases. The PC 1 then determines whether or not the older version application has been started (S411). If the older version has been started (S411: YES), the older version is terminated (S413). In contrast, if the older version has not been started (S411: NO), the process skips step S413.

In step S401, if only the older version program has been installed, a negative determination is made that it is impossible to obtain the latest version storage folder (S401: NO). Such a negative determination is made, for example, in the following situation:

The latest version application has been executed, and consequently, the older version "Apri.exe" is renamed to "Apri_bak.exe" in step S429 (to be described later). The newer version "Apri.exe" is written in the older version storage folder in step S431. After that, the latest version application has been uninstalled. The version information on the older version application that is not uninstalled is not stored in the registry in its section "Version" in FIG. 3A. (It is not uncommon that no consideration is given for version management when an older version application is designed and that a modification is made to its version management method when the application is drastically upgraded).

Specifically, in this situation, when the "Apri.exe" written in the older version storage folder is executed to perform this application process, since the latest version information has been deleted from the registry due to uninstallation, a negative determination is made in step S401. In this case, a program that should be recognized as the latest version is the "Apri_bak.exe" contained in the folder that stores the "Apri.exe" that is presently performing this application process.

It is noted that in step S405, an affirmative determination may be made that the "Apri_bak.exe" is contained in the folder which stores the "Apri.exe" that is now performing this application process (S405: YES). Such an affirmative determination is made, for example, in the following situation:

The latest version application has been executed, and consequently, the older version "Apri.exe" is renamed to "Apri_bak.exe" in step S429 (to be described later). The newer version "Apri.exe" is then written in the older version folder in step S431. After that, the latest version application has been uninstalled. The version information on the older version application that is not uninstalled is stored in the registry. In this situation, the "Apri.exe" that is written in the older version storage folder is executed to perform the application process of FIG. 10. The version information for the version newer than the "Apri.exe" that is now executing the application process of FIG. 10 is, however, deleted from the registry due to its uninstallation. So, the "Apri.exe" starts operating as the latest version program. Therefore, an affirmative determination is made in steps S401 and S403. In this case, a program that should be recognized as the latest version "Apri.exe" is the "Apri_bak.exe" contained in the folder that stores the "Apri.exe" that is now performing this application process.

So, if a negative determination is made in step S401 (S401: NO), or if an affirmative determination is made in step S405 (S405: YES), the PC 1 executes the "Apri_bak.exe" contained in the folder that stores the "Apri.exe" presently performing this application process (S415). Steps S411 and S413 are not performed after step S415, since step S415 is executed not immediately after the latest version application is newly installed.

As steps S401 through S415 have been thus completed, the PC 1 then searches the registry for the folder which stores the older version program (S421). If both the latest version and older version programs have been installed, or if only the older version program has been installed, the older version storage folder is detected in step S421. In contrast, if only the latest version program has been installed, the older version storage folder is not detected.

The PC 1 then determines whether or not the older version storage folder has been detected (S423). If the older version storage folder has been found (S423: YES), the PC 1 checks in S424 whether or not the PC 1 is executing the process of S407 to perform the process contained in the "Apri.exe" that performs this application process and therefore is operating as the latest version application. If a determination is made affirmative that the PC 1 operates as the latest version application by performing the process contained in the "Apri.exe" that performs this application process (S424: YES), the PC 1 determines whether or not the "Apri.exe" performing this application process has been incorporated into the older version storage folder (S425). This determination is equivalent to a determination whether the "Apri.exe" appearing in the older version storage folder does not correspond to the older version main program that does not contain this application process, or to the non-latest version main program.

If a determination is made that the "Apri.exe" performing this application process is not incorporated into the older version storage folder in step S425 (S425: NO), the PC 1 further determines whether or not the file "Apri_bak.exe" is contained in the older version storage folder (S427). If the older version storage folder has no "Apri_bak.exe" (S427: NO), this means that step S429 has not been performed. Therefore, the older version "Apri.exe" is renamed to "Apri_bak.exe" (S429), and the newer version "Apri.exe" is written in the older version storage folder (S431). That is, the PC 1 copies the newer version program file "Apri.exe" stored in the latest version storage folder into the older version storage folder. Thus, through steps S429 and S431, the newer version "Apri.exe" is incorporated in the older version storage folder.

The determination made in step S427 is advantageous for the following reason:

When the older version program is installed, the original "Apri.exe" is stored in its folder. The original "Apri.exe" is renamed to "Apri_bak.exe" in step S429. Accordingly, after the newer version "Apri.exe" is stored in the folder in step S431, even if a further newer version application is installed, the original "Apri.exe" renamed to "Apri_bak.exe" will not be lost.

In any of the following cases, steps S429 and S431 are skipped: the case in which the older version storage folder is not found (S423: NO); the case in which the process contained in the "Apri.exe" performing this application process is not executed and therefore the "Apri.exe" performing this application process does not operate as the latest version application (S424: NO); the case in which a determination is made that the "Apri.exe" performing this application process is incorporated in the older version storage folder (S425: YES); and the case in which the "Apri_bak.exe" is contained in the older version storage folder (S427: YES).

After steps S429 and S431 are performed or skipped, the PC 1 terminates the process based on this program. Subsequently, either of the following operations continues on the PC 1: the operation performed in a separate thread in step S407; and the operation started as a separate process in step S409 or S415.

To summarize, the application process flows as described below:

<1> When the latest version application is first activated, the latest version program "Apri.exe" contained in the latest version storage folder is executed. Accordingly, the application process of FIGS. 10 and 11 is executed. In this case, the process generally flows from S401, through S403, S405, S407, S411, S421, S423, S424, S425, S427, S429, and S431, and ends.

<2> When the latest version application is activated after the first activation of the latest version <1>, the latest version program "Apri.exe" contained in the latest version storage folder is executed. Accordingly, the application process of FIGS. 10 and 11 is executed. In this case, the process generally flows from S401, through S403, S405, S407, S411, S421, S423, S424, and S425, and ends.

<3> Assume that after the first activation of the latest version <1>, the older version application is activated. In such a case, the latest version program "Apri.exe" contained in the older version storage folder is executed. Accordingly, the application process of FIGS. 10 and 11 is executed. In this case, the process generally flows from S401, through S403, S409, S411, S421, S423, and S424, and ends. Thus, although the older version application is activated, the latest version application is executed by executing the latest version program file "Apri.exe" contained in the latest version storage folder.

<4> Assume that the latest version is uninstalled after the first activation of the latest version <1>. In such a case, when the older version application is activated, the latest version program "Apri.exe" contained in the older version storage folder is executed. Accordingly, the application process of FIGS. 10 and 11 is executed. In this case, the process generally flows: from S401, through S415, S421, S423, and S424, to its end; or from S401, through S403, S405, S415, S421, S423, and S424, to its end. Thus, the older version application is activated by executing the older version program file "Apri_bak.exe".

While the invention has been described in detail with reference to the embodiments thereof, it would be apparent to those skilled in the art that various changes and modifications may be made therein without departing from the spirit of the invention.

For example, the above first and third embodiments relate to the case in which the configuration modification program is incorporated into the start program of an application. The second embodiment relates to the case in which the configuration modification program is incorporated into the installation program. The PCI may execute the installation program in the second embodiment, and execute the start program of the application in either one of the first and third embodiments.

In each of the first and third embodiments, in S317 or S431, the PC 1 copies the newer version program, which is stored in the latest version storage folder in its file having the path name "Apri.exe", into the older version storage folder in its file having the same path name "Apri.exe". That is, because the newer version program file already exists in the HDD 15 in the newer version storage folder in the file having the path name "Apri.exe", the newer version program file is generated in the older version storage folder, by simply copying the newer version program into a file that is newly prepared in the older version storage folder and that has the same path name "Apri.exe".

It is noted that if data of the newer version program exists in a compressed format in the HDD 15 or a removable media device readable by the PC 1, the newer version program file "Apri.exe" may be generated in the older version storage folder by decompressing the compressed file to have the path name "Apri.exe".

Or, the newer version program file "Apri.exe" may be generated in the older version storage folder by creating the newer version program file "Apri.exe" based on internal data that is provided to be used by the application program of FIG. 6, FIGS. 8 and 9, or FIGS. 10 and 11.

What is claimed is:

1. An information processor including an older version program and a latest version program of the same application software installed thereon, the information processor comprising:
   a storing unit that is capable of storing an older version program file and a latest version program file, the older version program file having a first path name and storing an older version program, the latest version program file having a prescribed path name and storing a start program different from the latest version program;
   an association storing unit that stores an association between the first path name and a predetermined start event such that occurrence of the predetermined start event is detected as a request to execute a program in a program file having the first path name;
   an older version detection unit that judges whether the older version program is detected;
   a path name modification unit that modifies the first path name of the older version program file to a second path name if the older version detection unit detects the older version program;

a start program file generation unit that generates a start program file storing a start program the same as the start program in the latest version program file and names a third path name of the start program file identical to the first path name of the older version program file; and
a start program file executing unit that starts the start program stored in the start program file having the third path name identical to the first path name, in response to detection of the occurrence of the predetermined start event as a request to execute a program in a program file having the first path name,
wherein the start program file executing unit includes:
a latest version judging unit that judges whether the latest version program is detected; and
a version selecting unit that:
starts the latest version program when the latest version program is detected; and
starts the older version program stored in the older version program file having the second path name, without renaming the second path name back to the first path name, when the latest version program is not detected as a result of uninstallation of the latest version program.

2. The information processor according to claim 1, further comprising a management storage area for registering information on a folder storing the older version program when the older version program is installed on the information processor,
wherein when the information on the folder storing the older version program exists within the management storage area, the older version detection unit detects the installed older version program based on the information within the management storage area.

3. The information processor according to claim 1, wherein the older version detection unit detects a program stored in a file having the first path name as the older version program if the program stored in the file having the first path name is different from the start program that is to be stored in the start program file that is to be generated by the start program file generation unit.

4. The information processor according to claim 1, further comprising:
an older version starting status determination unit that determines whether or not the older version program has been started; and
a termination control unit that terminates the started older version program if the older version starting status determination unit determines that the older version program has been started.

5. The information processor according to claim 1, further comprising a latest version installation unit which installs the latest version program thereon.

6. A method of modifying a configuration of an information processor including an older version program and a latest version program of the same application software installed thereon, the information processor comprising: a storing unit that is capable of storing an older version program file and a latest version program file, the older version program file having a first path name and storing the older version program, the latest version program file having a prescribed path name and storing a start program different from the latest version program; and an association storing unit that stores an association between the first path name and a predetermined start event such that occurrence of the predetermined start event is detected as a request to execute a program in a program file having the first path name, and the method comprising:

judging whether the older version program is detected;
modifying the first path name of the older version program file to a second path name if the older version program is detected;
generating a start program file storing a start program the same as the start program in the latest version program file and naming a third path name of the start program file identical to the first path name of the older version program file;
starting the start program stored in the start program file having the third path name identical to the first path name in response to detection of the occurrence of the predetermined start event as a request to execute a program file having the first path name;
judging whether the latest version program is detected;
starting the latest version program when the latest version program is detected; and
starting the older version program stored in the older version program file having the second path name, without renaming the second path name back to the first path name, when the latest version program is not detected as a result of uninstallation of the latest version program.

7. The method according to claim 6, further comprising registering information on a folder storing the older version program when the older version program is installed on the information processor,
wherein when the information on the folder storing the older version program exists within the management storage area, the installed older version program is detected based on the information within the management storage area.

8. The method according to claim 6, wherein a program stored in a file having the first path name is detected as the older version program if the program stored in the file having the first path name is different from the start program that is to be stored in the start program file to be generated.

9. The method according to claim 6, further comprising:
determining whether or not the older version program has been started; and
terminating the started older version program if the older version program has been started.

10. The method according to claim 6, further comprising installing the latest version program on the information processor.

11. A storage medium storing a set of program instructions executable on an information processor, the set of program instructions for modifying a configuration of the information processor including an older version program and a latest version program of the same application software installed thereon, the information processor comprising: a storing unit that is capable of storing an older version program file and a latest version program file, the older version program file having a first path name and storing the older version program, the latest version program file having a prescribed path name and storing a start program different from the latest version program; and an association storing unit that stores an association between the first path name and a predetermined start event such that occurrence of the predetermined start event is detected as a request to execute a program in a program file having the first path name, and the instructions instructing the information processor to perform processes comprising:
judging whether the older version program is detected;
modifying the first path name of the older version program file to a second path name if the older version program is detected;

generating a start program file storing a start program the same as the start program in the latest version program file and naming a third path name of the start program file identical to the first path name of the older version program file;

starting the start program stored in the start program file having the third path name identical to the first path name in response to detection of the occurrence of the predetermined start event as a request to execute a program file having the first path name;

judging whether the latest version program is detected;

starting the latest version program when the latest version program is detected; and starting the older version program stored in the older version program file having the second path name, without renaming the second path name back to the first path name, when the latest version program is not detected as a result of uninstallation of the latest version program.

12. The storage medium according to claim 11, wherein the instructions further comprise registering information on a folder storing the older version program when the older version program is installed on the information processor, wherein when the information on the folder storing the older version program exists within the management storage area, the installed older version program is detected based on the information within the management storage area.

13. The storage medium according to claim 11, wherein a program stored in a file having the first path name is detected as the older version program if the program stored in the file having the first path name is different from the start program that is to be stored in the start program file to be generated.

14. The storage medium according to claim 11, the wherein the instructions further comprise:

determining whether or not the older version program has been started; and terminating the started older version program if the older version program has been started.

15. The storage medium according to claim 11, wherein the instructions further comprise installing the latest version program on the information processor.

16. The information processor according to claim 1, wherein the association storing unit further stores an association between the prescribed path name and another predetermined start event such that occurrence of the another predetermined start event is detected as a request to execute a program in a program file having the prescribed path name, and wherein the information processor further includes a latest version program file executing unit that starts the start program stored in the latest version program file having the prescribed path name, in response to detection of the occurrence of the another predetermined start event as a request to execute a program in a program file having the prescribed path name.

17. The method according to claim 6, wherein the association storing unit further stores an association between the prescribed path name and another predetermined start event such that the occurrence of the another predetermined start event is detected as a request to execute a program in a program file having the prescribed path name, and wherein the method further comprises:

starting the start program stored in the latest version program file having the prescribed path name, in response to detection of the occurrence of the another predetermined start event as a request to execute a program in a program file having the prescribed path name.

18. The storage medium according to claim 11, wherein the association storing unit further stores an association between the prescribed path name and another predetermined start event such that occurrence of the another predetermined start event is detected as a request to execute a program in a program file having the prescribed path name, and wherein the instructions further comprise:

starting the start program stored in the latest version program file having the prescribed path name, in response to detection of the occurrence of the another predetermined start event as a request to execute a program in a program file having the prescribed path name.

* * * * *